July 10, 1934.  H. B. HERDEG  1,965,837
SPECIFIC GRAVITY AND ELECTROLYTE LEVEL INDICATOR FOR BATTERIES
Filed Dec. 6, 1930
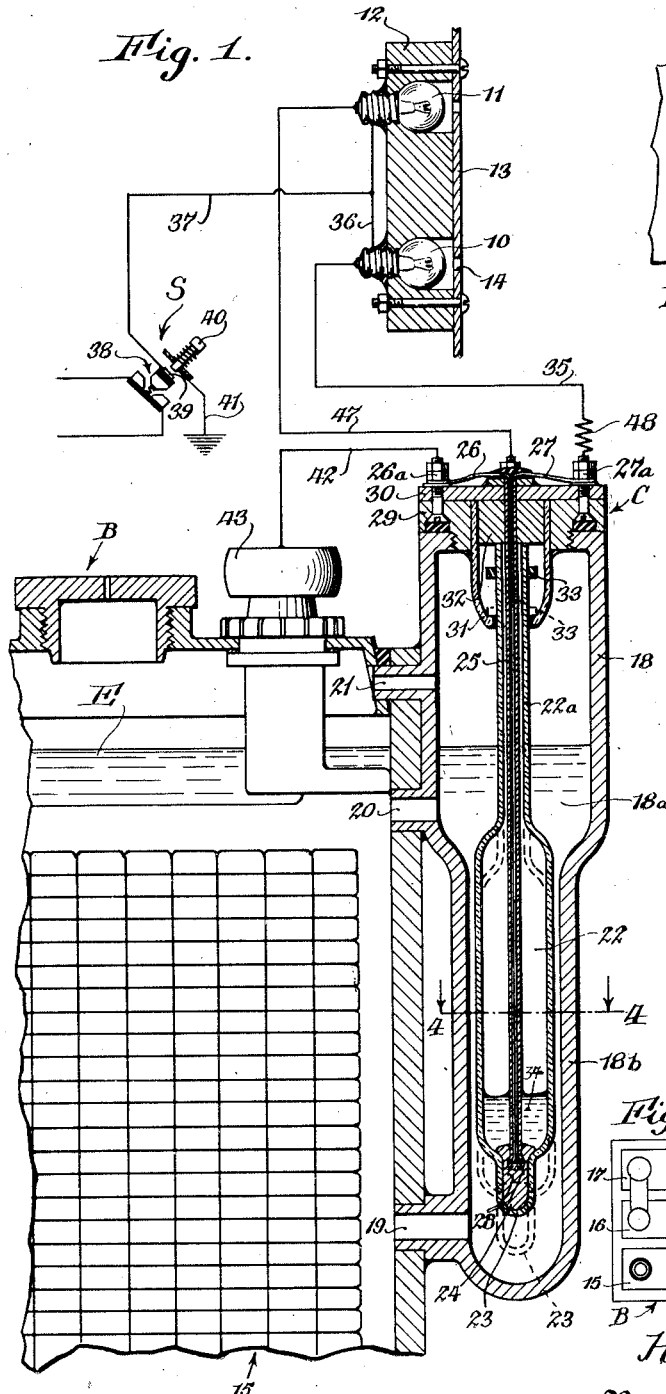
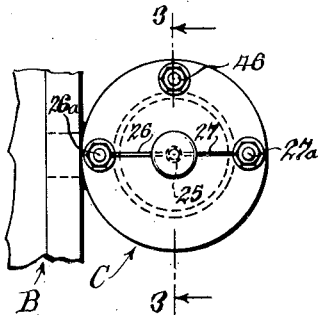
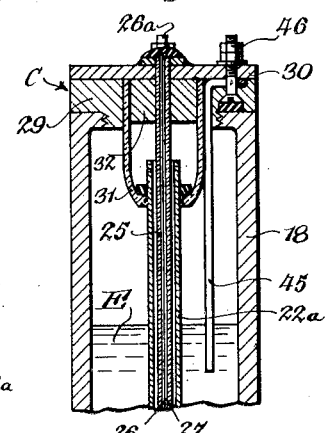
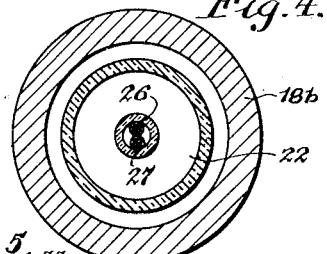
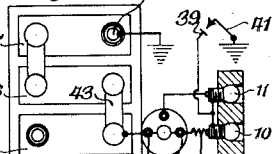
Inventor
Howard B. Herdeg
By Popp and Powers Attorney Patented July 10, 1934

1,965,837

UNITED STATES PATENT OFFICE 1,965,837

SPECIFIC GRAVITY AND ELECTROLYTE LEVEL INDICATOR FOR BATTERIES

Howard B. Herdeg, Buffalo, N. Y.

Application December 6, 1930, Serial No. 500,519

4 Claims. (Cl. 200—52)

This invention relates to an indicating device for use in connection with a storage battery and is designed to indicate positively that the specific gravity of and the height of the electrolyte are at, or above, predetermined values.

Although available for other uses, the invention has particular utility when employed in conjunction with the storage battery of an automobile. When employed in this connection, the storage battery is usually supported from the chassis of the vehicle below the body thereof and it is necessary, therefore, in order to determine the specific gravity or the height of the electrolyte, to first remove those parts of the body directly above the battery. The rate of loss of the electrolyte due to evaporation, or other causes, varies widely in different installations, as does the charge and discharge rate. Hence, in order to maintain the electrolyte at a sufficient height or to determine its specific gravity it is necessary to make frequent examinations, many of which serve no purpose other than to satisfy the operator that the height of and specific gravity of the electrolyte are at or above the desired minimum values.

One object of the invention is a device of the kind generally described in which means is provided for positively indicating that the specific gravity of the electrolyte is at, or above, a predetermined value.

A further object is a device in which means is provided for positively indicating that the electrolyte is at, or above a predetermined height, this object contemplating the use of the electrolyte as part of the operating circuit of the indicator.

A still further object is a device in which the specific gravity and electrolyte level indicators are included in a circuit controlled by a common switch, thereby insuring correct reading of the specific gravity indicator.

The invention is illustrated in the accompanying drawing, in which:

Figure 1 is a fragmentary sectional view of one end of a battery showing a device constructed in accordance with the invention applied thereto.

Figure 2 is a fragmentary view in plan of the battery and associated parts.

Figure 3 is a fragmentary view showing the position of the hydrometer when the specific gravity of the electrolyte is less than the predetermined value.

Figure 4 is a section taken along line 4—4 of Fig. 1.

Figure 5 is a diagrammatic view of the device and wiring system therefor.

As illustrated, the device includes lamps 10 and 11 which are carried by and supported in an insulating block 12. The latter is preferably secured in any suitable manner behind the instrument panel 13 of the vehicle, the instrument panel being formed as at 14 with openings through which light from the lamps is emitted when the latter are illuminated. The lamps 10 and 11 serve, when illuminated, to indicate that the specific gravity and height, respectively, of the electrolyte are at, or above, the desired minimum values.

The storage battery B with which the device is associated may be of any suitable type. As illustrated, it includes three cells 15, 16 and 17. An auxiliary electrolyte chamber 18a is provided by a hollow receptacle 18, the latter being secured as by lateral hollow extensions 19, 20 and 21 to the battery adjacent the cell 15. The said extensions, in addition to supporting the receptacle, provide means of communication between the cell 15 and the chamber 18a, whereby the level of the electrolyte E in the auxiliary chamber 18a is maintained at the same level as that in the cell 15. The receptacle 18 is formed to extend a substantial distance above the level of the electrolyte and carries a closure member C. The extensions 19 and 20 are preferably arranged so that circulation of the electrolyte is maintained between the cell and the chamber 18a. The extension 21 provides communication between the cell and the chamber above the level of the electrolyte. As the closure member C is preferably formed to seal the mouth of the receptacle 18, the extension 21 serves to provide means for admitting air from the cell into the chamber it being understood, of course, that air is admitted into the cell through the filler cap of the cell in the usual manner. Thus, not only is the electrolyte in the chamber 18a of the same height as that in cell 15 but it is also of the same specific gravity.

In order to indicate that the specific gravity of the electrolyte is at, or above, a predetermined value, a hydrometer 22 is immersed in the electrolyte in the receptacle 18, the latter as shown, being preferably reduced in cross section as at 18b so that the chamber 18a at this point is slightly larger in diameter than that of the hydrometer 22. The reduced portion of the receptacle serves to guide the hydrometer during its movement along a vertical path.

The hydrometer is formed with an elongated reduced neck 22a which is designed to extend above the electrolyte throughout its range of movement. At its lower end, the hydrometer is preferably reduced as at 23 and in this reduced end a conductive material 24, such as mercury, is carried, the latter being adapted in the upper position of the hydrometer to enable closing of the circuit which includes the lamp 10. For this purpose, the closure member C carries a hollow tube 25 which houses wires 26 and 27, the latter being connected at their upper ends to binding posts 26a and 27a respectively and at their lower ends extending beyond the lower end of the tube 25, as at 28. In this connection, it will be understood that the wires are insulated from each other throughout their extent through the tube 25, as best shown in Figure 4, and at their lower ends 28 are uninsulated so that they may be electrically connected by the conducting material 24 when they are immersed in, or contacted with the same. It will, therefore, be apparent that the tube 25 and the wires 26 and 27 which pass through it are supported stationary relative to the battery. Hence, upon movement of the hydrometer 22 the lower ends of the wires may be electrically connected and disconnected through the medium of the conductive material 24. The closure member C by which the said tube and wires are supported in the manner described includes a threaded body member 29 and a disk 30, the said body member and disk being preferably secured together by the binding posts 26a and 27a. The body member 29 is formed with a suitable bore in which is tightly secured a sleeve member 31, the latter extending below the body member and being tapered in the direction of its mouth toward the stem of the hydrometer. The sleeve member 31 serves to assist in guiding the hydrometer during its movements and also prevents the electrolyte in the receptacle 18 from rising to such an extent as to enter the mouth of the hydrometer stem. The tube 25 is preferably supported by a rubber plug 32 which is fitted tightly within the sleeve member 31. A rubber ring 33 is carried by the stem 22a of the hydrometer within the sleeve 31 and is adapted as the hydrometer approaches the lower limit of its range of movement to seal the mouth of the sleeve, as best shown in Figure 3, it being apparent that at the upper limit of its range of movement, the mouth of the hydrometer stem is sealed by the plug 32.

The hydrometer is designed so that the specific gravity of the electrolyte is just sufficient at the desired minimum value to maintain it in the position shown in Figure 1. Thus, the wires 26 and 27 will be connected at their lower ends by the conductive material 24 as long as the specific gravity of the electrolyte is at or above the predetermined minimum value, the latter being for most practical purposes in the neighborhood of 1.215. Should the specific gravity of the electrolyte become less than the predetermined minimum value, the hydrometer will drop to the position indicated by dotted lines in Figure 1, whereupon the lower ends of the wires 26 and 27 will be supported above and out of contact with the conductive material and hence electrically disconnected. It is preferred that the conductive material 24 be covered with a non-conductive liquid 34 such as light oil. Thus, when the terminal portion of the wires 26 and 27 are withdrawn from the conductive material 24, they will be immersed in the oil thereby preventing access of air and consequent oxidation of the said terminal portions.

The wire 27 is connected through the binding post 27a to the lamp 10 by wire 35. As shown and preferred, the connection of the lamp 10 to power is effected by the starter switch S of the automobile. The movable member 38 of the switch, therefore, carries a contact 39, the latter being connected to the lamp 10 by wires 36 and 37. The starter button 40 by which the movable member is operated is suitably grounded as by wire 41 to the frame of the vehicle. The other wire 26 is connected through the binding post 26a by wire 42 to the bar 43 which connects cells 15 and 16. Thus, upon depression of the starter button 40, the specific gravity of the electrolyte being at or above the half charge value, a circuit is completed through the lamp 10 from the connector bar 43 through wire 42, wire 26, conducting material 24, wire 27, wire 35, wire 36, wire 37, contact 39, wire 41 to ground, ground to battery post 44 (grounded) and cells 16 and 17 to bar 43.

Means is provided whereby upon depression of the starter button the lamp 11 is also connected to power if, at this time, the electrolyte in the chamber 18a is at, or above, a predetermined height. For this purpose, the closure member C carries a depending rod 45, the lower end of which extends to a point below which it is undesirable that the level of the electrolyte fall. Thus, under normal operating conditions the rod 45 will extend into the electrolyte, as best shown in Figure 3. At its upper end, the rod 45 is connected to a binding post 46 and the latter is connected by wire 47 to the lamp 11. The other side of the lamp is connected to the contact member 39 by wires 36 and 37, the same wires by which lamp 10 is connected to the said contact member. Thus, upon depression of the starter button 40, not only is a circuit established through lamp 10 but a circuit is also established through lamp 11, the latter circuit including rod 45, wire 47, wire 36, wire 37, contact 39, ground wire 41, terminal post 44, cells 17 and 16 and the electrolyte between plates of cell 15 connected to the bar 43 and the rod 45. In a three cell battery, as illustrated, the lamps 10 and 11 will receive current of approximately four volts. Because of the additional electrolyte in the circuit of lamp 11, however, the lamp 11 will glow less brightly. For this reason, therefore, a resistance 48 is preferably included in the circuit of the lamp 10 whereby both lamps will glow with substantially the same brilliance.

From the foregoing, it will be apparent that each time the operator of the vehicle depresses the starter button 40 a positive signal is automatically given. If, at the time, the specific gravity of the electrolyte and the height of the electrolyte are above the predetermined minimum values. Thus, as long as both of the lamps are illuminated the operator is advised that there is no necessity for adding distilled water or attempting to conserve energy. If, on the other hand, the lamp 10 is not illuminated upon depression of the button while the lamp 11 is illuminated, the operator is warned that the specific gravity of the electrolyte is below the predetermined minimum value and that energy should be conserved or the charge rate increased. Whenever the lamp 11 is not illuminated by the depression of the starter button, the operator is warned that the level of the electrolyte is below the desired minimum height and this can be remedied by the addition of distilled water.

While the lamps 10 and 11 are illustrated in connection with a circuit controlled by the starter button, an independent switch may be employed if desired.

For practical purposes, a single auxiliary electrolyte chamber will be adequate as in general any cell of the battery will indicate sufficiently for the purposes in view the condition of the remaining cells. It will, of course, be obvious that an auxiliary electrolyte chamber may, if desired, be employed in connection with each cell of the battery.

In the embodiment illustrated, the electrolyte chamber is provided by the receptacle 18 thereby enabling application of the invention to a storage battery of standard form without the necessity of changing its construction. The auxiliary chamber may, as distinguished from the form shown, be included within the cell with which it is associated, if desired, in which case accommodation for it may be provided by either cutting away portions of the plates or by modifying the form of the battery case.

In any event, the operator of the vehicle is informed at intervals as to the condition of the battery, thereby insuring its attention when needed but avoiding unnecessary examinations. At the same time, the operator is enabled to determine when it is desirable that he should conserve energy and when such conservation is unnecessary.

I claim as my invention:

1. An improvement in specific gravity indicators for the electrolyte of a battery comprising a hydrometer which is immersed in the electrolyte, said hydrometer having a hollow stem which extends above the level of the electrolyte in the various positions of the hydrometer, electrical conductors which are adapted to be included in the indicator circuit and which extend through said stem into said hydrometer, said conductors having spaced terminal portions and a conductive material carried by said hydrometer, the terminal portions of said conductors contacting with said material while the specific gravity of the electrolyte is above a predetermined value, said hydrometer being adapted when the specific gravity of the electrolyte falls below said predetermined value to lower and disconnect the terminal portions of said conductors.

2. An improvement in electrical specific gravity indicators for the electrolyte of a battery comprising a hydrometer which is immersed in the electrolyte, said hydrometer having a hollow stem which extends above the level of the electrolyte in the various positions of the hydrometer, stationary conductors which are adapted to be included in the indicator circuit and which extend through said stem into said hydrometer, said conductors having spaced terminal portions and a conductive liquid carried by said hydrometer, the terminal portions of said conductors extending into said liquid while the specific gravity of the electrolyte is above a predetermined value, said hydrometer being adapted to lower when the specific gravity of the electrolyte falls below said predetermined value whereby to disconnect the terminal portions of said conductors.

3. An improvement in specific gravity indicators for the electrolyte of a battery comprising a hydrometer which is immersed in the electrolyte, said hydrometer having a hollow stem which extends above the level of the electrolyte in the various positions of the hydrometer, stationary conductors which are included in the indicator circuit and which extend through said hollow stem into said hydrometer, said conductors having spaced terminal portions, mercury in said hydrometer into which the terminal portions of said conductor extend when the specific gravity of the electrolyte is above a predetermined value, said hydrometer being adapted to lower when the specific gravity of the electrolyte falls below said predetermined value whereby to disconnect said conductors and a body of oil covering said mercury for preventing oxidation of the terminal portions of said conductors when not immersed in said mercury.

4. An improvement in specific gravity indicators for the electrolyte of a battery comprising a hydrometer which is immersed in the electrolyte, said hydrometer having a hollow stem which extends above the level of the electrolyte in the various positions of the hydrometer, a stationary sleeve into which the end of said stem fits, said sleeve permitting axial movement of said stem, electrical conductors which are included in the indicator circuit and which extend through said stem into said hydrometer, said conductors having spaced terminal portions and a conductive material carried by said hydrometer, the terminal portions of said conductors contacting with said material while the specific gravity of the electrolyte is above a predetermined value, said hydrometer being adapted to lower when the specific gravity of the electrolyte falls below said predetermined value and disconnect said conductors.

HOWARD B. HERDEG.